United States Patent [19]

Dromigny et al.

[11] Patent Number: 4,710,116

[45] Date of Patent: Dec. 1, 1987

[54] SYSTEM FOR FEEDING FILM, FORMING A PARTIAL COATING AT LEAST OF A MOLDED OBJECT, INTO A MOLD

[75] Inventors: Pierre Dromigny, 54 avenue de Versailles, 75016 Paris, France; Théodore Schöttli, Duessenhofen, Switzerland

[73] Assignee: Pierre Dromigny, Paris, France

[21] Appl. No.: 877,742

[22] Filed: Jun. 24, 1986

[51] Int. Cl.⁴ ............................................. B29C 49/24
[52] U.S. Cl. ...................................... 425/125; 156/497; 264/509; 271/103; 425/126 R; 425/522
[58] Field of Search ........... 425/116, 117, 125, 126 R, 425/127, 129 R, 138, 436 R, 522, 503, 504; 264/509; 156/497; 271/11, 90, 103; 249/83

[56] References Cited

U.S. PATENT DOCUMENTS

| | | | |
|---|---|---|---|
| 4,204,824 | 5/1980 | Paradis | 425/436 R |
| 4,355,967 | 10/1982 | Hellmer | 264/509 X |
| 4,359,314 | 11/1982 | Hellmer | 264/509 X |
| 4,368,018 | 1/1983 | Rees et al. | 425/138 |
| 4,549,863 | 10/1985 | Bourgeois | 425/126 R |
| 4,563,148 | 1/1986 | Hasl et al. | 425/126 R X |
| 4,595,449 | 6/1986 | Nowicki | 156/497 X |
| 4,636,166 | 1/1987 | Franks et al. | 425/522 X |
| 4,637,600 | 1/1987 | Bartimes et al. | 156/497 X |
| 4,639,206 | 1/1987 | Darr | 264/509 X |
| 4,639,341 | 1/1987 | Hanamoto et al. | 264/509 X |
| 4,679,997 | 7/1987 | Plenzler et al. | 425/126 R |
| 4,680,000 | 7/1987 | Nowicki et al. | 271/103 X |

FOREIGN PATENT DOCUMENTS 150739  8/1984  Japan .............................. 425/126 R Primary Examiner—Richard L. Chiesa
Attorney, Agent, or Firm—Fisher, Christen & Sabol

[57] ABSTRACT

A system is provided for bringing a film, forming at least a partial coating of a molded object, into a mold. In this system, the transport device includes means for holding the film in position during transport thereof from the waiting position to the working position, and two cooperating members, of the rack or screw type, meshing with each other, the first of which is parallel to the direction of movement of the movable part of the mold and is fixed to one of the parts thereof and the second of which is secured to the means for holding the film in position and may slide in the movable part of the mold.

6 Claims, 2 Drawing Figures

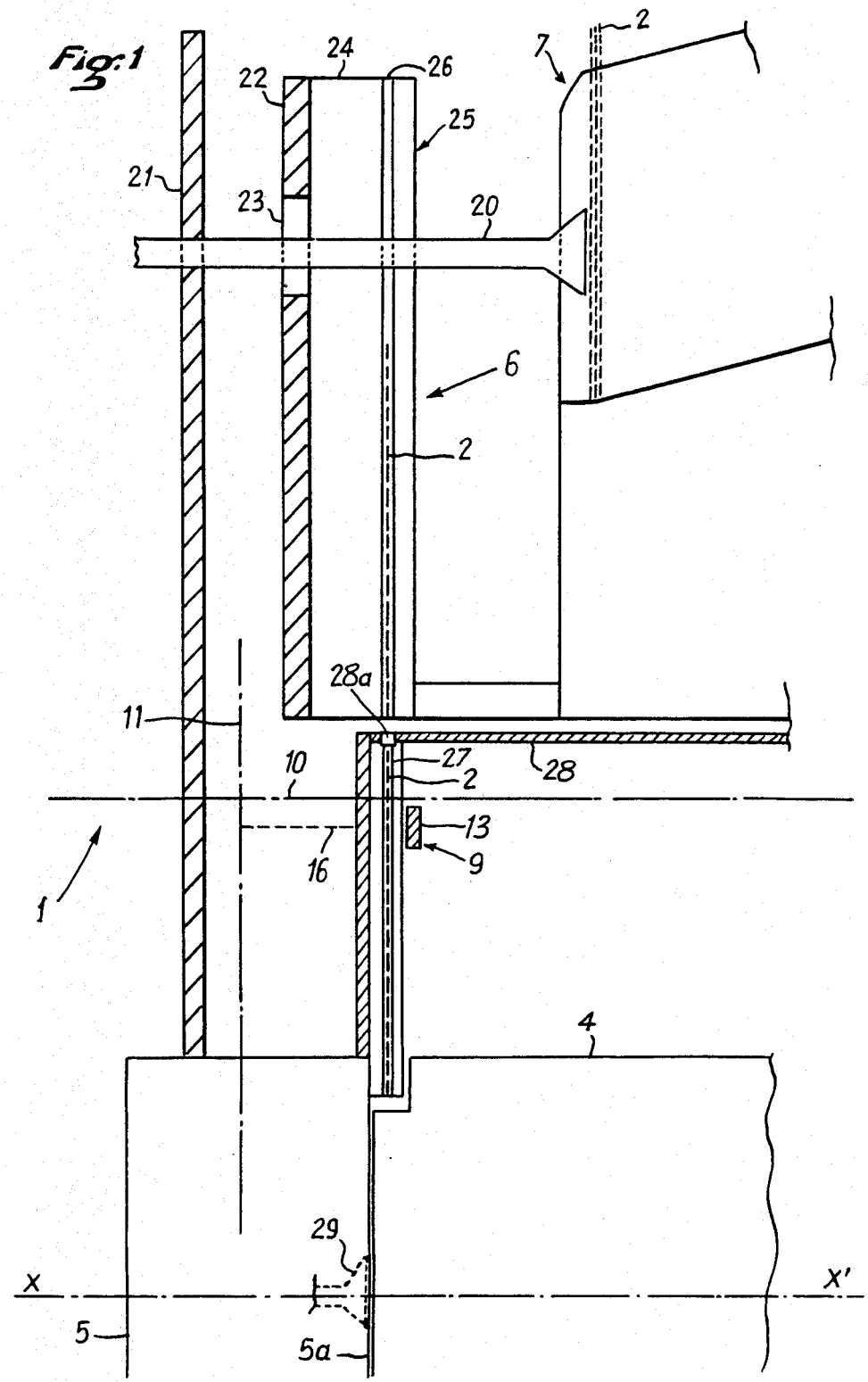

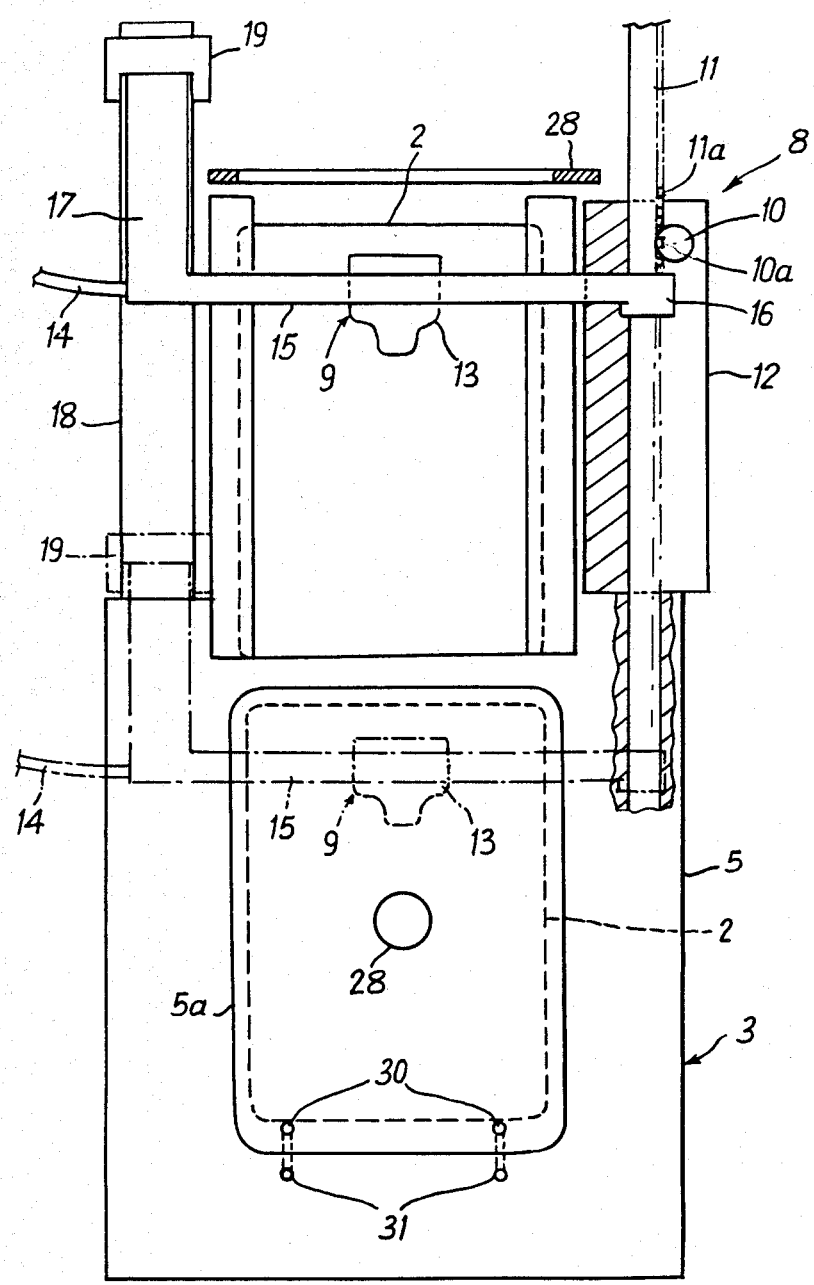

SYSTEM FOR FEEDING FILM, FORMING A PARTIAL COATING AT LEAST OF A MOLDED OBJECT, INTO A MOLD

BACKGROUND OF THE INVENTION

The present invention relates to a system for feeding a film, forming at least a partial coating of a molded object, between the fixed part of a mold and the part thereof which is movable in a predetermined direction with respect to the fixed part.

A known system of this type includes a device for transferring, one by one, films precut to the desired format from a magazine in a waiting position in the neighborhood of the mold, and a device for transporting the film from the waiting position to a working position in which the film is situated between the fixed and movable parts of the mold.

The transport device is more particularly formed, in this case, by simple slides extending as far as the position in which the film is effectively situated between the fixed and movable parts of the mold and in which the side edges of the film slide as far as this working position.

It will nevertheless be understood that such a device does not allow a film to be brought between the fixed and movable parts of the mold if the film has dimensions less than the object to be molded. This is in the case for example for a label applied to a container lid.

The purpose of the present invention is then to overcome this drawback by providing a system for feeding a film between the fixed and movable parts of a mold which is efficient whatever the dimensions of a film with respect to the object to be molded.

SUMMARY OF THE INVENTION

For this, the system for feeding a film, forming at least a partial coating of a molded object, between the fixed part of a mold and the part thereof which is movable in a predetermined direction with respect to the fixed part, of the above mentioned type, is particularily remarkable in that the transport device includes means for holding the film during transport thereof from the waiting position to the working position and two cooperating members, of the rack or screw type meshing with each other, the first of which is parallel to the direction of movement of the moving part of the mold and is secured to one of the parts thereof, and the second is integral with the means holding the film and may slide in the movable part of the mold so that any movement of the movable part in said direction of movement with respect to the fixed part causes sliding of the second member in the movable part of the mold and a given concomitant movement, in a plane parallel to the front face of the movable part of the mold, of said holding means towards or away from said front face.

According to another feature of the invention, the first and second members, of the rack or screw type are orthogonal and have teeth extending for example at an angle at least substantially equal to 45° with respect to their longitudinal axis.

According to yet another feature of the invention the first rack is integral with the fixed part of the mold and the free end part thereof passes, as well as at least a part of the second rack, through a common box secured to the mobile part.

According to another feature of the invention, the holding means for the film comprise at least one suction member, such as a nozzle, carried by an arm generally parallel to the plane of the transported film, one end of which is fixed to the second rack and the other end of which may slide along a guide upright secured to the mobile part of the mold.

According to yet another feature of the invention, the transfer device is situated generally above the mold and includes at least a suction member, such as a nozzle, fixed to the movable part of the mold and able to pass through the front face of the film magazine whose side walls in the front part include internal slides facing each other and situated, in the closed position of the mold, immediately above slides fixed to the moving part of the mold and provided above the front face thereof.

According to yet another feature of the invention, at least one suction element, such as a nozzle, is provided in the movable part of the mold for holding the label in the working position, once it has been brought by the transfer device.

BRIEF DESCRIPTION OF THE DRAWINGS

The invention will be better understood and other details, advantages and characteristics thereof will appear more clearly from the following explanatory description of a preferred embodiment of the invention, with reference to the schematical accompanying drawings in which:

FIG. 1 is a schematical side view, in partial section, of a system for bringing a film between the fixed and movable parts of a mold; and FIG. 2 is a front view, in partial section, of the mobile part of the mold including the device for transporting a film from a waiting position to a working position, in accordance with the invention.

DESCRIPTION OF THE PREFERRED EMBODIMENT

Referring to the drawings, the system 1 for bringing a film 2, forming at least a partial coating of a molded object, between the fixed part 4 of a mold 3 and the part 5 thereof which is movable, in a direction of movement X, X' predetermined with respect to the fixed part 4, includes a device 6 for transferring, one by one, films precut to the desired format from a magazine 7 in a waiting position in the vicinity of the mold, and a device 8 for transporting the film from the waiting position to a working position in which the film 2 is situated between the fixed 4 and mobile 5 parts of the mold 3. Referring more particularly to FIG. 2, the transport device 8 includes means 9 for holding the film 2 during its transport from the waiting position to the working position, and two cooperating members 10, 11 of the rack or screw type, meshing with one another. The first member 10 is parallel to the direction of movement X, X' of the moving part 5 of mold 3 and is secured to one of the parts 4, 5 thereof. The second member 11 is secured to the means 9 for holding the film and may slide in the mobile part 5 of the mold. Thus, any movement of the mobile part 5 in the direction of movement X, X', with respect to the fixed part 4, causes sliding of the second member 11 in the movable part 5 of the mold 3 and a given concomitant movement, in a plane parallel to the front face 5a of the movable part 5 of the mold, of the holding means 9 towards or away from the front face 5a of the movable part 5.

In particular, the first 10 and second 11 cooperating members of the rack or screw type are orthogonal.

They may be provided, as in the example illustrated, as a rack formed of a round bar having, on a flat longitudinal part thereof, teeth 10a, 11a which mesh with one another and extending, for example, through an angle at least substantially equal to 45° with respect to the longitudinal axis of the bar. With such a slant angle, for a given stroke, for example horizontal, of one of said racks, the result is a vertical stroke, of length identical to the first one, of the second rack. It is obvious that the slant angles of the teeth may be chosen depending on the desired ratio of the strokes of the two racks which it is desired to obtain. Thus, for a slant angle of for example 30° the ratio between the strokes of two racks will be of the order of 1:2.

It will be readily understood that with such cooperating members, particularly of the rack type, opening of mold 3 will cause movement of the holding means 9, driving the film 2 from the waiting position to the work position. In fact, during opening of the mold, the movement in direction X, X' of the second rack 11 which may moreover slide along its longitudinal axis in the movable part of the mold is accompanied, because of the meshing of the teeth at 45°, by a movement orthogonal to the direction of movement X, X' of the movable part of the mold that is to say for example a vertical downward movement. Since the means 9 for holding film 2 are fixed to the second rack 11, the movement of this latter, caused by opening the mold, through the first rack 10 parallel to the direction of movement of the movable part of the mold, will cause the film to move from the waiting position situated generally above the mold, to the working position in the vicinity of the front face 5a of the movable part 5 of the mold.

Similarly, during closure of the mold, the holding means 9 (this time of course without the film) will undergo the reverse movement, that is to say a movement from the work position to the waiting position.

The first rack 10 may more particularly be fixed to the fixed part 4 of the mold 3 and its free end part, as well as at least a part of the second rack 11, passes through a common box 12 secured to the movable part 5. As is illustrated, the means 9 for holding film 2 comprise at least one suction element, such as a nozzle 13, connected by a pipe 14 to a vacuum source (not shown) and carried by an arm 15 generally parallel to the plane of the transported film, one end of which 16 is fixed to the second rack 11 and the other end 17 of which may slide, by means for example of a ball joint 19, along a guide upright 18 secured to the movable part 5 of mold 3.

The transfer device 6 is situated, in the example illustrated, generally above mold 3 and includes at least one suction element, such as a nozzle 20, fixed to the movable part 5 of the mold 3 through an upright 21. Nozzle 20 may pass through the front face 22 of the film magazine 7 through an orifice 23 included therein. The side walls 24 of the front part 25 of the magazine 7 have internal slides 26 facing each other which are situated, in the closed position of the mold 3, immediately above slides 27 secured to the movable part 5 of the mold and provided above the front face 5a thereof. A plate 28 whose slot 28a is situated immediately above the slides 27 is provided immediately below the magazine 7 and is secured to the movable part 5 of mold 3.

It will be further noted that at least one suction element, such as a nozzle 29, is provided in the movable part 5 of mold 3 for holding the label in the working position once it has been brought by the transfer device 6, in cooperation with stops 30 provided in the lower part of said movable part 5 and fixed to ejectors 31.

The system for bringing a film, in accordance with the present invention, operates in the following way.

When the mold 3 is opened (shown in the closed position in FIG. 1), the suction nozzle 20 drives a film 2 as far as the slides 26, provided in the front part of magazine 7, where it slides as far as the lower part of magazine 7. Once mold 3 is again in the closed position, the slides 26 are facing slides 27 into which the film 2 slides through the slots 28a in plate 28 as far as stops (not shown). The film 2 is then in the waiting position such as defined above, of the mold; where it may then be sucked and held in position under the action of the nozzle 13 (position shown with a continuous line in FIG. 2) at the same time as the mold opens, because of the functional connection provided by the two racks 10, 11 and described above, the holding means 9, comprising the suction nozzle 13, driving the film 2 move down parallel to the plane of the front face 5a of the movable part 5 of the mold as far as the working position opposite this front face where film 2 comes into abutment against studs 30 which are retractable in the closed position of the mold (broken line position).

Then, as soon as the mold is closed, the suction of nozzle 13 is stopped and the film 2 is then sucked by nozzle 29 provided in the movable part 5, whereas, during closure of the mold, the holding means 9 (without the film) rise up into the waiting position following the movement the reverse of the first. Thus, films are brought, whatever the format thereof, in perfect synchronism with the opening-closing of the mold.

The mold, in itself, may of course be of any known type. For example, the synthetic molding material may be injected from the fixed part of the mold forming the male part.

What is claimed is:

1. In a molding machine, comprising a mold having a fixed part and a movable part, and a magazine for films each forming at least a partial coating of a molded object, a system for bringing a film between the fixed part of the mold and the part thereof which is movable, in a predetermined direction of movement, with respect to the fixed part, comprising:

a device for transferring films precut to the desired format, one by one, from the magazine to a waiting position in the vicinity of the mold; and a device for transporting the film from the waiting position to a working position in which the film is situated between the fixed and movable parts of the mold, including means for holding the film in position during its transport from the waiting position to the working position, and two cooperating members, of the rack or screw type, meshing with each other, the first of which is parallel to the direction of movement of the movable part of the mold and is fixed to one of the parts thereof, and the second of which is fixed to the means for holding the film in position and may slide in the movable part of the mold, so that any movement of the movable part, in said direction of movement, with respect to the fixed part, causes sliding of the second member in the movable part of the mold and a given concomitant movement, in a plane parallel to the front face of the movable part of the mold, of said holding means towards or away from said front face.

2. The machine as claimed in claim 7, wherein said first and second members of the rack or screw type are orthogonal and have teeth extending through an angle at least substantially equal to 45° with respect to their longitudinal axis.

3. The machine claimed in claim 2, wherein the first cooperating member is a rack that is secured to the fixed part of the mold and passes, as well as at least a part of the second rack, through a common box fixed to the mobile part.

4. The machine claimed in claim 1, wherein said means for holding the film in position include at least one suction element carried by an arm generally parallel to the plane of the transported film, one end of which is secured to a second rack and the other end of which may slide along a guide upright secured to the movable part of the mold.

5. The machine claimed in claim 1, wherein said transferring device is situated generally above the mold and includes at least one suction element fixed to the mobile part of the mold and able to pass through the front face of the film magazine whose side walls in the front part have internal facing slides situated, in the closed position of the mold, immediately above slides fixed to the mobile part of the mold and provided above the front face thereof.

6. The machine claimed in claim 1, wherein at least one suction element is provided in the movable part of the mold for holding a label in the working position once it has been brought by the transferring device.

* * * * *